(12) United States Patent
Komatsu et al.

(10) Patent No.: US 7,966,905 B2
(45) Date of Patent: Jun. 28, 2011

(54) SHIFT APPARATUS

(75) Inventors: Atsushi Komatsu, Saitama (JP); Toru Ishino, Saitama (JP); Shinji Oka, Saitama (JP); Shinichi Yone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/156,608

(22) Filed: Jun. 3, 2008

(65) Prior Publication Data

US 2008/0302196 A1     Dec. 11, 2008

(30) Foreign Application Priority Data

Jun. 7, 2007   (JP) .................. 2007-151248

(51) Int. Cl.
*B60K 20/00*   (2006.01)
(52) U.S. Cl. .................. 74/473.21; 74/473.26
(58) Field of Classification Search .......... 74/473.18, 74/473.21, 473.26
See application file for complete search history.

(56) References Cited

U.S. PATENT DOCUMENTS

| | | | |
|---|---|---|---|
| 6,360,624 B1 * | 3/2002 | Sedlmaier et al. ........ | 74/335 |
| 6,904,822 B2 | 6/2005 | Meyer et al. | |
| 7,028,575 B2 | 4/2006 | Ehrmaier et al. | |
| 7,094,177 B2 | 8/2006 | Inoue et al. | |
| 2006/0283276 A1 | 12/2006 | Komatsu et al. | |

FOREIGN PATENT DOCUMENTS

| | | |
|---|---|---|
| DE | 20 2004 004 151 U1 | 7/2004 |
| EP | 1 338 831 A2 | 8/2003 |
| JP | 2002-519229 T | 7/2002 |
| JP | 2005-007993 A | 1/2005 |
| JP | 2005-504685 T | 2/2005 |
| JP | 2006-347308 | 12/2006 |
| JP | 2006-347314 | 12/2006 |
| JP | 2006-349016 A | 12/2006 |

* cited by examiner

*Primary Examiner* — Justin Holmes
(74) *Attorney, Agent, or Firm* — Carrier Blackman & Associates, P.C.; William D. Blackman; Joseph P. Carrier

(57) ABSTRACT

A shift apparatus includes a shift lever operable to select a first mode of a transmission when the shift lever is disposed at a first position and to select a second mode of the transmission when the shift lever is disposed at a second position, and a base supporting the shift lever. The shift lever automatically returns to a home position after selecting the first mode or the second mode. When moving the shift lever from the home position to the first position to select the first mode, the shift lever is moved in a first direction and then in a second direction which is different from and not directly opposite to the first direction. When moving the shift lever from the first position to the second position to select the second mode, the shift lever is moved in a third direction which is different from the first and second directions and not directly opposite to the second direction.

4 Claims, 3 Drawing Sheets

PRIOR ART

SHIFT APPARATUS

FIELD OF THE INVENTION

The present invention relates to a shift apparatus operable to electrically switch a coupling mode of a transmission in accordance with a shifting operation in a shift-by-wire system.

DESCRIPTION OF THE RELATED ART

Shift apparatuses of a shift-by-wire system have, for example, a shift lever of a joystick-type, and an actuator operable to switch a coupling mode of an automatic transmission when the actuator is electrically operated in accordance with a driver's operation of the shift lever. FIG. 5 is an explanatory view of a related-art shift apparatus 100 disclosed in JP 2005-504685 A. As shown in FIG. 5, a shift lever of the shift apparatus 100 has a home position X, a neutral position N on a left side of the home position X, a reverse position R on a front side of the neutral position N, and a drive position D on a rear side of the neutral position N.

The shift apparatus 100 is configured such that, when the shift lever is released from a driver's hand after being moved from the home position X to any of the positions R, N and D, the shift lever is automatically returned to the original home position X.

A first direction a' from the home position X toward the neutral position N and a second direction b' from the neutral position N toward the reverse position R are not opposite from each other, while the second direction b' and a third direction c' from the neutral position N toward the drive position D are opposite directions.

According to this shift apparatus 100, the shift lever can be easily operated to move from the home position X to the neutral position N, simply by linearly moving the shift lever toward the left from the home position X. However, there is a disadvantage in the known design of this reference, in that the shift lever may be erroneously operated to move from the home position X to the neutral position N due to an unintentional external force applied to the shift lever in a leftward direction f', for example, when the shift lever is accidentally hit by an elbow of the driver.

In order to operate the shift lever to move from the home position X to the drive position D or to the reverse position R, the shift lever is firstly moved from the home position X to the neutral position N, and then a direction in which the shift lever is to be moved from the neutral position N is changed by 90 degrees. If the shift lever is a joystick-type, operability of the shift lever improves in that the shift lever may also be operated in an obliquely leftward direction d' or e' when moving the shift lever from the home position X to the drive position D or to the reverse position R. However, in such a case, there is a disadvantage in that the shift lever may be erroneously operated to move to the drive position D or to the reverse position R due to an unintentional external force applied to the shift lever in the obliquely leftward direction d' or e', for example, when the shift lever is accidentally hit by an elbow of the driver.

SUMMARY OF THE INVENTION

It is an object of the present invention to prevent an erroneous operation of a shift apparatus resulting from an unintentional application of external force.

According to an aspect of the present invention, shift apparatus includes a shift lever operable to select a first mode of a transmission when the shift lever is disposed at a first position and to select a second mode of the transmission when the shift lever is disposed at a second position, and a base supporting the shift lever. The shift lever automatically returns to a home position after selecting the first mode or the second mode. When moving the shift lever from the home position to the first position to select the first mode, the shift lever is moved in a first direction and then in a second direction which is different from the first direction and not directly opposite to the first direction. When moving the shift lever from the first position to the second position to select the second mode, the shift lever is moved in a third direction which is different from the first direction and the second direction and not directly opposite to the second direction.

The first mode may be, for example, a neutral mode, and the second mode may be, for example a reverse mode or a drive mode. The first to third directions are operating directions of the shift lever upon selecting the respect modes of the transmission, and may be, for example, a rearward direction, a leftward direction, a forward direction respectively.

According to the shift apparatus having such a configuration, the first mode of the transmission is selected by sequentially moving the shift lever, from the home position, in the first direction and then in the second direction. The second direction is different from the first direction and is not directly opposite to the first direction. Therefore, the shift lever is prevented from being erroneously operated even when an unintentional force is applied to the shift lever in the first direction, since the shift lever needs to be further moved in the second direction in order to select the first mode.

Moreover, the second mode is selected by moving the shift lever, from the first position, in the third direction which is different from the first and second directions and is not directly opposite to the second direction. That is, in order to move the shift lever from the home position to the second shift position, the shift lever needs to be operated in the first, second and third directions. Therefore, the shift lever is prevented from being erroneously operated due to an unintentional external force to the shift lever.

According to another aspect of the present invention, the shift lever may be further operable to select a third mode of the transmission when the shift lever is disposed at a third shift position. When moving the shift lever from the first position to the third position to select to third mode, the shift lever is moved in a fourth direction. The fourth direction is different from the third direction and is parallel to the first direction.

According the shift apparatus having such a configuration, when moving the shift lever to the third position, the shift lever needs to be moved in the fourth direction from the first position. Therefore, the shift lever is prevented from being erroneously operated to select the third mode even if to an unintentional external force is applied to the shift lever.

DETAILED DESCRIPTION

Hereinafter, exemplary embodiments of the invention will be explained with reference to the drawings. The following exemplary embodiments do not limit the scope of the invention.

In the following description, a top and a bottom of the drawings will be "front" and "rear" while a right and a left of the drawings will be "right" and "left" as it is for convenience of explanation, although the respective directions are actually optional since they depend on a location and an orientation of a shift apparatus.

Automatic Transmission

Figure 1:
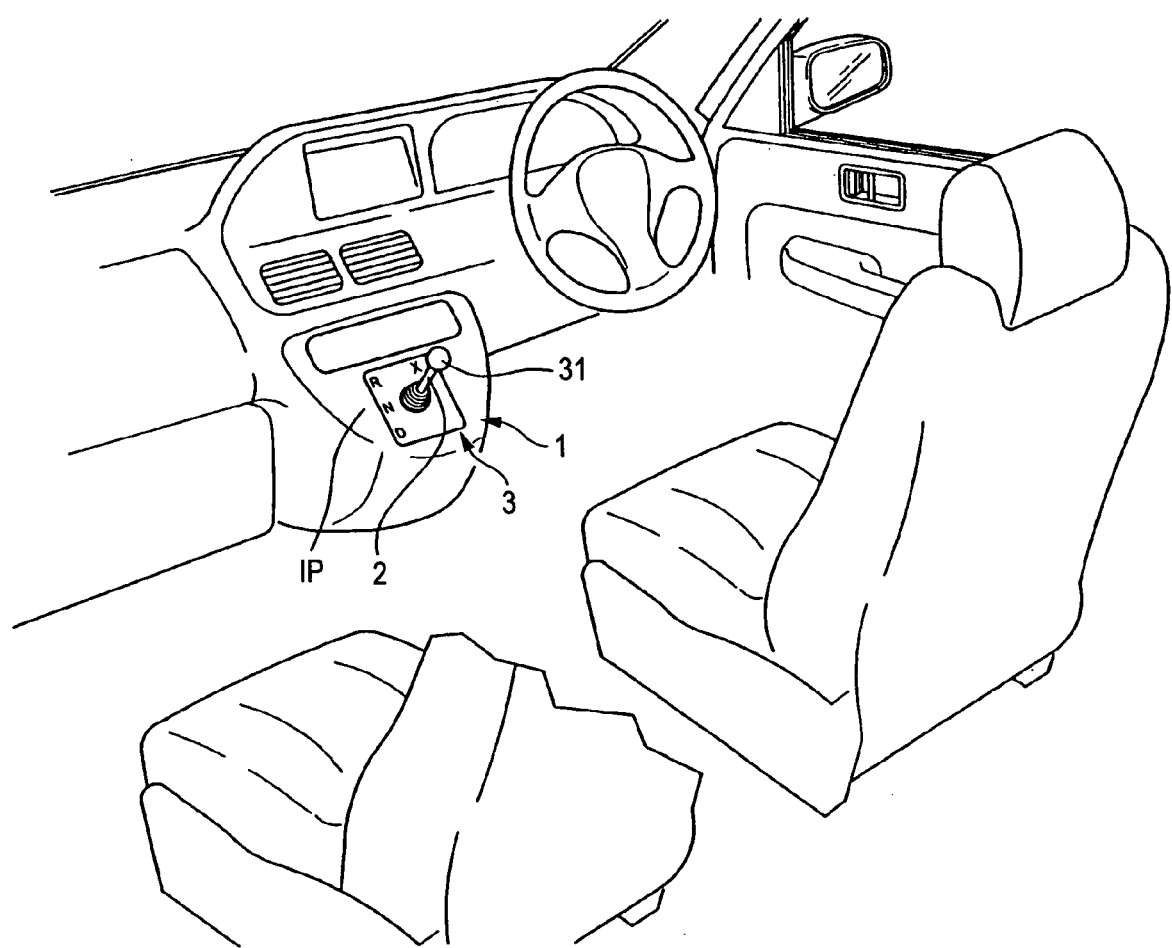
FIG. 1 is a perspective view showing a shift apparatus according to an exemplary embodiment of the present invention.

Prior to an explanation of a shift apparatus 1 shown in FIG. 1, a configuration of an automatic transmission (not shown) will be briefly explained.

An automatic transmission is a device which automatically performs an operation of a clutch and transmission system. The automatic transmission has, for example, a reverse mode corresponding to a reverse position R in the shift apparatus 1, a neutral mode corresponding to a neutral position N in the shift apparatus 1, and a drive mode corresponding to a drive position D in the shift apparatus 1. A driver can select the respective modes of the automatic transmission by operating a shift lever 2 of the shift apparatus 1. The automatic transmission is electrically coupled to the shift apparatus 1 and a control unit (not shown), and is controlled by the control unit in accordance with a signal, i.e., shift selection signal from the shift apparatus 1.

Shift Apparatus

As shown in FIG. 1, the shift apparatus 1 has the shift lever 2 for selecting the modes of the automatic transmission. The shift lever 2 is movable, for example, to four shift positions, namely a home position X, the neutral position N (a first shift position), the reverse position R (a second shift position), and the drive position D (a third shift position). The shift apparatus 1 further includes a base 3 supporting the shift lever 2, a click mechanism (not shown) operable to provide a feeling of a click when the shift lever 2 is operated from the home position X to the neutral position N, and a shift position switch (not shown) operable to detect the respective positions of the shift lever 2. The shift apparatus 1 is attached to an instrument panel IP between a driver seat and a front passenger seat such that the shift lever 2 is protruded therefrom.

Shift Lever and Base

The shift lever 2 may be a joystick having a knob 31 at an upper end portion thereof, as shown in FIG. 1. The base 3 has an escutcheon through which the shift lever 2 is inserted and a case (not shown) disposed below the escutcheon. The shift lever 2 is pivotably supported by the base 3 so as to be movable in front, rear, right and leftward directions.

The escutcheon 3 is an ornamental plate on which characters "R", "N", "D" and "X", each indicating the respective shift positions R, N, D, X of the shift lever 2, are marked, and may be attached to the instrument panel IP.

Home Position

Figure 2:
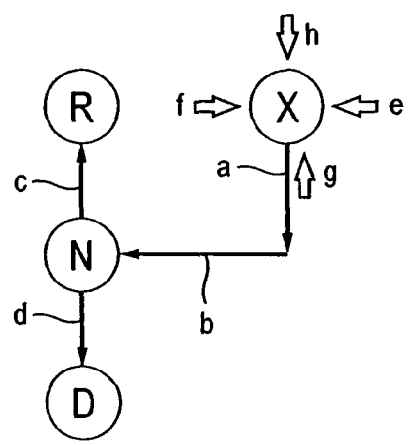
FIG. 2 is an explanatory view of an arrangement of shift positions in a shift apparatus according to an exemplary embodiment of the present invention.

As shown in FIG. 2, the home position X is arranged on a right front side. The home position X is a position to which the shift lever 2 is automatically returned upon release thereof by a driver, after being moved to the neutral position N, the reverse position R, or the drive position D.

Neutral Position (First Shift Position)

The neutral position N is a position corresponding to the neutral mode of the automatic transmission. The neutral position N is selectable by sequentially operating the shift lever 2, from the home position X, in a rearward direction a (a first direction) and then in a leftward direction b (a second direction) which is different from the rearward direction a and is not directly opposite to the rearward direction a.

Reverse Position (Second Shift Position)

The reverse position R is a position corresponding to the reverse mode of the automatic transmission. The reverse position R is selectable by operating the shift lever 2, from the neutral position N, in a forward direction c (a third direction) which is different from the rearward direction a (the first direction) and the leftward direction b (the second direction) and is not directly opposite to the leftward direction b.

Drive Position (Third Shift Position)

The drive position D is a position corresponding to the drive mode of the automatic transmission, and is selectable by operating the shift lever 2, from the neutral position N, in a rearward direction d (a fourth direction) which is parallel to the direction a.

Click Mechanism (Detent Mechanism)

The click mechanism is operable to guide an operating direction of the shift lever 2, which is pivoted in accordance with a shifting operation by the driver, while preventing an unnecessary play of the shift lever 2. In addition, the click mechanism provides a feeling of a click upon the shifting operation of the shift lever 2. The click mechanism includes a guide groove which is formed along selected operation paths of the shift lever 2 extending from the home position X to the respective positions N, R, D to support the shift lever 2 such that the shift lever 2 is automatically returned to the home position X, a pin which is brought into press-contact with the groove, and a spring biasing the pin. More specifically, the groove is formed along the rearward directions a, d, the leftward direction b, and the forward direction c as shown in FIG. 2.

A publicly-known one of the click mechanism is applicable. For example, the click mechanism may be similar to a detent mechanism of a shift apparatus disclosed in JP 2006-347308 A.

Shift Position Switch

The shift position switch is operable to detect the respective positions of the shift lever 2. The shift position switch includes a magnet (a movable contact) which moves together with the shift lever 2, and a hall element (a fixed contact) for detecting a position of the magnet when the shift lever 2 is operated to respective positions. The shift selection signals corresponding to the respective positions of the shift lever 2 are output from the shift position switch to the control unit.

A publicly-known one of the shift position switch is applicable. For example, the shift position switch may similar to a shift detecting device disclosed in JP 2006-347314 A.

Operations of Shift Apparatus

Figure 3A:
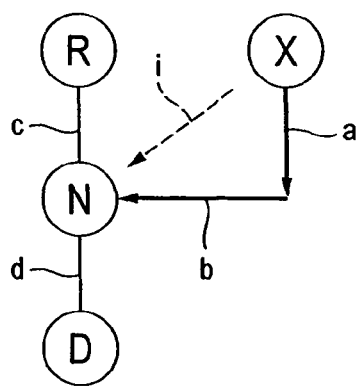
FIG. 3A is an explanatory view showing an operation of a shift lever of the shift apparatus when selecting a neutral mode of a transmission.
Figure 3B:
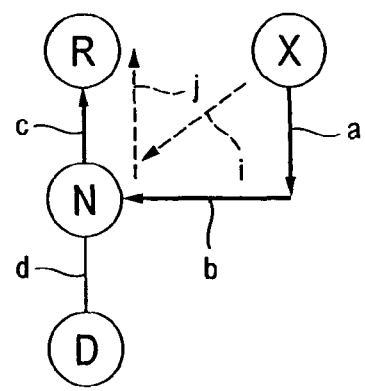
FIG. 3B is another explanatory view showing an operation of the shift lever when selecting a reverse mode of the transmission.
Figure 3C:
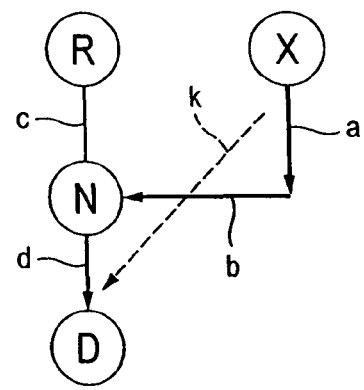
FIG. 3C is another explanatory view showing an operation of the shift lever when selecting a drive mode of the transmission.

Next, operations of the shift apparatus 1 will be explained mainly with reference to FIGS. 2 to 3C.

Shift Lever not in Operation

When the shift lever 2 is not operated by the driver, the shift lever 2 is automatically returned to the home position X by the click mechanism. When the shift lever 2 is disposed at the home position X, the shift lever 2 is supported such that the shift lever does not move even if an external force is applied to the shift lever 2 in right and leftward directions e, f or in a forward direction g. When an external force is applied to the shift lever 2 in a rearward direction h, the shift lever 2 is moved in the rearward direction a (the first direction), and is stopped on a right side of the neutral position N.

That is, when the shift lever 2 is disposed at the home position X, the shift lever 2 is prevented from being erroneously operated due to an unintentional force applied to the shift lever 2 in any of the directions e, f, g, h.

Selection of Neutral Mode

Next, with reference to FIG. 3A, an explanation will be given of an operation of the shift lever 2 when selecting the neutral mode of the automatic transmission, i.e. when moving the shift lever 2 from the home position X to the neutral position N.

When selecting the neutral mode of the automatic transmission, the shift lever 2 is moved, from the home position X, in the rearward direction a and then in the leftward direction b.

In other words, when operating the shift lever 2 from the home position X to the neutral position N, the shift lever 2 needs to be moved in the rearward direction a and then in the leftward direction b. Therefore, even when an external force is accidentally applied to the shift lever 2 in any of the directions e, f, g, h, e.g. by hitting the shift lever 2 with the elbow of the driver, the shift lever 2 is prevented from being erroneously moved to the neutral position N.

In an actual operation, the driver may attempt to apply force to the shift lever 2 in an obliquely rearward direction i, directly toward the neutral position N from the home position X, when selecting the neutral mode. However, because of the pin and guide groove construction of the click mechanism described above, the path for movement of the shift lever 2 is limited, and the application of force in an obliquely rearward direction will result in the shift lever moving in the directions a and b, rather than in the direction i. When the shift lever 2 is moved from a path along the rearward direction a into a path along the leftward direction b, the driver feels a click upon a change of the directions in which the shift lever 2 is moved. Therefore, even when the driver accidentally applies force to the shift lever 2 in the direction i, the click makes the driver notice the erroneous operation so that the driver can stop pushing the shift lever 2 to prevent the erroneous operation.

When the shift lever 2 is operated to be disposed at the neutral position N, the corresponding shift selection signal is transmitted from the shift position switch to the control unit, whereby the control unit converts the automatic transmission to be in the neutral mode.

Further, when the driver releases the hand from the shift lever 2 disposed at the neutral position N, the shift lever 2 is automatically returned to the home position X by moving back the respective paths along the direction b and the direction a while being guided by an inclined face of the groove of the click mechanism.

Selection of Reverse Mode

Next, with reference to FIG. 3B, an explanation will be given of an operation of the shift lever 2 when selecting the reverse mode of the automatic transmission, i.e. when moving the shift lever 2 from the home position X to the reverse position R.

When selecting the reverse mode of the automatic transmission, the shift lever 2 is moved, from the home position X, in the rearward direction a, the leftward direction b, and the forward direction c, in this order.

That is, the shift lever 2 needs to be operated in the forward direction c after being moved to the neutral position N. Thus, the shift lever 2 can be moved to the reverse position R by after operating the shift lever 2 from the home position X to the neutral position N by applying a force to the shift lever 2 in the obliquely rearward direction i from the neutral position N and then sequentially applying a force in the forward direction j.

In the operation, when the shift lever 2 passes the path along the rearward direction a and the leftward direction b, the driver feels the click. Further, when the shift lever 2 is moved to the neutral position N all the way along the path in the leftward direction b, the shift lever 2 is temporarily stopped by impinging on an edge of the path, and thereafter, needs to operated in the forward direction c toward the reverse position R by changing the operating direction by 90 degrees. Therefore, the shift lever 2 will not be operated in this way without a clear intension of the driver.

As described above, when moving the shift lever 2 from the home position X to the reverse position R, the shift lever 2 needs to be operated in the rearward direction a, the leftward direction b and the forward direction c in this order, or in the obliquely rearward direction i from the home position X toward the neutral position N and then in the forward direction j. Because the operating directions needs to be changed in this way in order to move the shift lever 2 to the reverse position R, the shift lever 2 is prevented from being erroneously operated due to an unintentional external force applied to the shift lever 2 in any of the directions e, f, g, h, e.g., a hit by the elbow of the driver.

When the shift lever 2 is operated to be disposed at the reverse position R, the corresponding shift selection signal is transmitted from a shift position switch to the control unit, whereby the control unit converts the automatic transmission to be in the reverse mode.

Further, when the driver releases the hand from the shift lever 2 disposed at the reverse position R, the shift lever 2 is automatically returned to the home position X by moving back the respective paths along the direction c, the direction b and the direction a due to a spring force of the click mechanism.

Selection of Drive Mode

Next, with reference to FIG. 3C, an explanation will be given of an operation of the shift lever 2 when selecting the drive mode of the automatic transmission, i.e. when moving the shift lever 2 from the home position X to the drive position D.

When selecting the drive mode of the automatic transmission, the shift lever 2 is moved, from the home position X, in the rearward direction a, the leftward direction b, and in the rearward direction d in this order.

That is, the shift lever 2 needs to be operated in the rearward direction d after being moved to the neutral position N in order for the drive position signal to be generated. Thus, the shift lever 2 can be moved to the drive position D by applying a force to the shift lever 2 in an obliquely rearward direction k from the home position X directly toward the drive position D, but because of the pin and guide groove construction of the click mechanism described above, the path for movement of the shift lever 2 is limited, and such application of force in the obliquely rearward direction k will move the shift lever in the directions a, b and d, in that sequence, depending on the force applied.

In the operation, when a moving direction of the shift lever 2 is changed from the rearward direction a to the leftward direction b, and when the moving direction of the shift lever 2 is changed from the leftward direction b to the rearward direction d, the driver feels a click.

According to the configuration described above, the shift lever 2 is prevented from being erroneously operated even when an unintentional external force is accidentally applied to the shift lever 2 in any of the directions e, f, g, h, e.g. by hitting the shift lever 2 with the elbow. Further, even when an unintentional force is applied in the obliquely rearward direction k, the driver can recognize the erroneous operation by a feeling of the click.

When the shift lever 2 is operated to be disposed at the drive position D, the corresponding shift selection signal is transmitted from a shift position switch to the control unit, whereby the control unit converts the automatic transmission to be in the drive mode.

Further, when the driver releases the hand from the shift lever 2 disposed at the drive position D, the shift lever 2 is automatically returned to the home position X by moving back the respective paths along the direction d, the direction b, and the direction a due to the spring force of the click mechanism.

Other Exemplary Embodiments

According to the exemplary embodiment shown in FIG. 2, the shift lever 2 of the shift apparatus 1 is movable to the four respective positions, namely the home position X the neutral position N, the reverse position R, and the drive position D. However, the number of position to be assigned to the shift lever is not limited to the four positions.

Figure 4A:
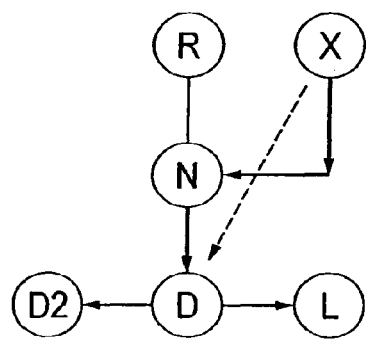
FIGS. 4A to 4C are explanatory views of various arrangement of shift positions according to other exemplary embodiments of the present invention.

For example, as shown in FIG. 4A, the shift apparatus 1 may be configured such that the shift lever 2 is moved to a position D2 on a left side of the position D and/or to a position L on a right side of the position D, in which the positions D, D2, L correspond to different drive modes of the automatic transmission.

Figure 4B:
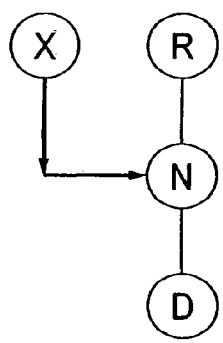

Further, the home position X may be arranged at a position other than the right front position as explained in the foregoing exemplary embodiments. For example, the home position X may be arranged at a left front position as shown in FIG. 4B, or at a left rear position or a right rear position.

Figure 4C:
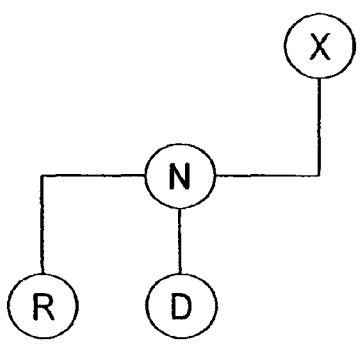
Figure 5:
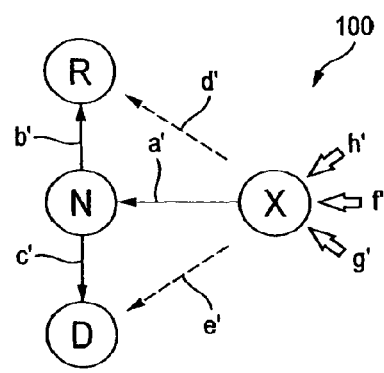
FIG. 5 is an explanatory view of an arrangement of shift positions in a shift apparatus according to the related art.

Furthermore, the position of the reverse position R may be arranged at a position other than the front side position as explained in the foregoing exemplary embodiments. For example, the reverse position R may be arranged at a left rear position as shown in FIG. 4C, or at a left front position or a right rear position.

Furthermore, although a feeling of a click is generated when the operation directions of the shift lever 2 is changed in the foregoing exemplary embodiments, the shift apparatus 1 may also be configured to generate one or more additional clicks with the pin biased by the spring and one or more protrusions.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A shift apparatus for use with an electronic shift-by-wire system for a vehicle, said shift apparatus comprising:
a shift lever operable to select a first mode of a transmission when the shift lever moves through a first predetermined sequence and is disposed at a first position, wherein the first mode is a first selectable mode among a plurality of selectable modes when moving the shift lever from a home position, and the shift lever is operable to select a second mode of the transmission when the shift lever moves through a second predetermined sequence and is disposed at a second position; and
a base supporting the shift lever,
wherein the shift lever is configured and arranged to automatically return to the home position when released by a user thereof after selecting the first mode or the second mode,
wherein, when moving the shift lever from the home position to the first position to select the first mode, the shift lever is initially moved in a first direction and then subsequently moved in a second direction which is different from the first direction and which is not directly opposite to the first direction, and
wherein, when moving the shift lever from the first position to the second position to select the second mode after the first predetermined sequence has been completed and prior to releasing the shift lever, the shift lever is moved in a third direction which is different from the first direction and from the second direction, and which is not directly opposite to the second direction.

2. The shift apparatus according to claim 1, wherein the shift lever is further operable to select a third mode of the transmission when the shift lever is disposed at a third shift position, and
wherein, when moving the shift lever from the first position to the third position to select the third mode and prior to releasing the shift lever, the shift lever is moved in a fourth direction which is different from the third direction and is parallel to the first direction.

3. A shift apparatus for use with an electronic shift-by-wire system for a vehicle, said shift apparatus comprising:
a shift lever operable to select a first mode of a transmission representing a neutral gear when the shift lever moves through a first predetermined sequence and is disposed at a first position, wherein the first mode is a first selectable mode among a plurality of selectable modes when moving the shift lever from a home position, and the shift lever is operable to select a second mode of the transmission when the shift lever moves through a second predetermined sequence and is disposed at a second position; and
a base supporting the shift lever,
wherein the shift lever is configured and arranged to automatically return to the home position when released by a user thereof after selecting the first mode or the second mode,
wherein, when moving the shift lever from the home position to the first position to select the first mode, the shift lever is initially moved in a first direction and then subsequently moved in a second direction which is different from the first direction and which is not directly opposite to the first direction, and
wherein, when moving the shift lever from the first position to the second position to select the second mode after the first predetermined sequence has been completed and prior to releasing the shift lever, the shift lever is moved in a third direction which is different from the first direction and from the second direction, and which is not directly opposite to the second direction.

4. The shift apparatus according to claim 3, wherein the shift lever is further operable to select a third mode of the transmission when the shift lever is disposed at a third shift position, and
wherein, when moving the shift lever from the first position to the third position to select the third mode and prior to releasing the shift lever, the shift lever is moved in a fourth direction which is different from the third direction and is parallel to the first direction.

* * * * *